United States Patent
Volk

(10) Patent No.: US 10,571,891 B2
(45) Date of Patent: Feb. 25, 2020

(54) PART PROCESSING

(71) Applicant: Incodema3D, LLC, Ithaca, NY (US)

(72) Inventor: Scott Volk, Ithaca, NY (US)

(73) Assignee: Incodema3D, LLC, Freeville, NY (US)

(*) Notice: Subject to any disclaimer, the term of this patent is extended or adjusted under 35 U.S.C. 154(b) by 328 days.

(21) Appl. No.: 14/947,732

(22) Filed: Nov. 20, 2015

(65) Prior Publication Data

US 2016/0199959 A1 Jul. 14, 2016

Related U.S. Application Data

(60) Provisional application No. 62/101,624, filed on Jan. 9, 2015.

(51) Int. Cl.
*G05B 19/4097* (2006.01)
*B24B 1/00* (2006.01)
*B24B 31/112* (2006.01)
*B33Y 40/00* (2015.01)
*B29C 64/35* (2017.01)
*B33Y 80/00* (2015.01)

(52) U.S. Cl.
CPC .......... *G05B 19/4097* (2013.01); *B24B 1/005* (2013.01); *B24B 31/112* (2013.01); *B29C 64/35* (2017.08); *B33Y 40/00* (2014.12); *B33Y 80/00* (2014.12); *G05B 2219/39567* (2013.01); *G05B 2219/45199* (2013.01)

(58) Field of Classification Search
CPC ....... B24B 1/005; B24B 31/112; B24B 31/14; B24B 31/006; B24B 31/102; G05B 19/4097; B29C 64/35

USPC .......................................................... 451/51
See application file for complete search history.

(56) References Cited

U.S. PATENT DOCUMENTS

| | | | | |
|---|---|---|---|---|
| 2,196,058 A | * | 4/1940 | Coats | B24B 31/006 451/326 |
| 3,702,758 A | * | 11/1972 | Fukui | B24B 31/14 51/298 |
| 4,175,930 A | | 11/1979 | Sakulevich et al. | |
| 5,046,289 A | * | 9/1991 | Bengel | B24C 3/325 15/104.05 |
| 6,139,407 A | | 10/2000 | Shinbo et al. | |
| 6,165,059 A | * | 12/2000 | Park | B24B 31/14 451/326 |
| 6,173,504 B1 | * | 1/2001 | Ohtsuka | G01B 5/016 33/559 |

(Continued)

FOREIGN PATENT DOCUMENTS

| CN | 203918724 | | 11/2014 |
|---|---|---|---|
| CN | 203918724 U | * | 11/2014 |

(Continued)

OTHER PUBLICATIONS

Gibson, "A discussion on the concept of a flexible rapid prototyping cell," Rapid Prototyping Journal, Jun. 1, 1996, pp. 32-38.*

(Continued)

*Primary Examiner* — Joseph J Hail
*Assistant Examiner* — J Stephen Taylor
(74) *Attorney, Agent, or Firm* — Fish & Richardson P.C.

(57) ABSTRACT

At least one magnetic medium is loaded into a cavity of a build piece. The build piece is created by an additive manufacturing process. The magnetic medium is magnetically moved in the cavity.

12 Claims, 6 Drawing Sheets

(56) References Cited

U.S. PATENT DOCUMENTS

| | | | | |
|---|---|---|---|---|
| 6,227,942 B1* | 5/2001 | Hoffman | ................. | B24B 1/005 |
| | | | | 451/104 |
| 6,231,426 B1 | 5/2001 | Liao | | |
| 7,252,576 B1* | 8/2007 | Komanduri | ............. | B24B 1/005 |
| | | | | 451/36 |
| 8,286,468 B2* | 10/2012 | Nishimura | ................ | C23C 4/02 |
| | | | | 73/105 |
| 8,568,200 B2 | 10/2013 | Liao | | |
| 2002/0119738 A1* | 8/2002 | Shinbo | ................. | B24B 31/102 |
| | | | | 451/51 |
| 2012/0088440 A1* | 4/2012 | Greenslet | ................ | B24B 1/005 |
| | | | | 451/51 |
| 2013/0075957 A1* | 3/2013 | Swanson | ................ | B08B 3/104 |
| | | | | 264/405 |
| 2015/0093970 A1* | 4/2015 | Greenslet | ................ | B24B 19/02 |
| | | | | 451/59 |

FOREIGN PATENT DOCUMENTS

| | | | | |
|---|---|---|---|---|
| GB | 1504445 A | * | 3/1978 | ............ B24B 31/14 |
| JP | H1110519 A | | 1/1999 | |
| WO | WO2014137890 | | 9/2014 | |

OTHER PUBLICATIONS

Euorpean Patent Patent Office, International Appln No. PCT/US2015/061979, Transmittal of the International Search Report and the Written Opinion of the International Searching Authority, 14 pages.
Raytech Metal Finishing Solutions [online]. Raytech 2010, [retrieved on Nov. 30, 2013]. Retrieved from the Internet: <URL: www.raytechmetalfinishing.com/centrifugal-tombstone.php>.

* cited by examiner

PART PROCESSING

CROSS-REFERENCE TO RELATED APPLICATION

Pursuant to 35 U.S.C. § 119(e), this application claims priority to U.S. Provisional Application Ser. No. 62/101,624, filed Jan. 9, 2015, the contents of which are hereby incorporated by reference.

TECHNICAL FIELD

This document relates to processing of manufactured parts, as well as articles made by such processes.

BACKGROUND

Additive manufacturing is a process of manufacturing whereby a build piece is created by adding a manufacturing medium (e.g., a metal, plastics) to a part, as opposed to removing media to create the part. Examples of additive manufacturing include, but are not limited to, i) additive metal deposition manufacturing, where a laser or other heat source sinters or melts a metal medium; ii) stereolithography, where a light source cures a photopolymer; and iii) fused deposition modeling, where a thermoplastic is extruded and cools to harden.

Many instances of additive manufacturing call for support structures to be built with the build piece. The support structures may be used, for example, to support overhangs or other geometry in the build piece that is not supported by lower layers of the build piece's geometry.

SUMMARY

In one aspect, a method includes loading at least one magnetic medium into a cavity of a build piece, the build piece created by an additive manufacturing process. The method further includes magnetically moving the magnetic medium in the cavity.

Implementations can include any, all, or none of the following features. The magnetic medium includes a material capable of being attracted by a magnet. The magnetic medium includes iron. The magnetic medium includes a material that has the properties of a magnet. The magnetic medium includes magnetite. The magnetic medium including an abrasive surface. The magnetic medium includes a magnetic core and a non-magnetic envelope. The non-magnetic envelope has an abrasive coating. Magnetically moving the magnetic medium in the cavity includes moving a magnet relative to the build piece. Moving a magnet relative to the build piece includes moving the magnet along a path computed based on a three dimensional definition of a part to be created by the additive manufacturing process. Magnetically moving the magnetic medium in the cavity includes pulsing an electromagnet. The method including assigning, responsive to magnetically moving the magnetic medium in the cavity of the build piece, a test result for the build piece based on the movement of the magnetic media. The cavity has a cavity surface; and magnetically moving the magnetic medium in the cavity polishes the cavity surface. The build piece has a support structure in the cavity; and wherein magnetically moving the magnetic medium in the cavity removes a support structure from the build piece. The additive manufacturing process results in a build material in the cavity; and wherein magnetically moving the magnetic medium in the cavity removes a build material from the cavity.

In one aspect, a system includes a magnetic manipulator configured to magnetically move at least one magnetic medium that has been loaded into a cavity of a build piece, the build piece created by an additive manufacturing process.

Implementations can include any, all, or none of the following features. The magnetic medium includes a material capable of being attracted by a magnet. The magnetic medium includes iron. The magnetic medium includes a material that has the properties of a magnet. The magnetic medium includes magnetite. The magnetic medium including an abrasive surface. The magnetic medium includes a magnetic core and a non-magnetic envelope. The non-magnetic envelope has an abrasive coating. Magnetically moving the magnetic medium in the cavity includes moving a magnet relative to the build piece Moving a magnet relative to the build piece includes moving the magnet along a path computed based on a three dimensional definition of a part to be created by the additive manufacturing process. Magnetically moving the magnetic medium in the cavity includes pulsing an electromagnet. The cavity has a cavity surface; and magnetically moving the magnetic medium in the cavity polishes the cavity surface. The build piece has a support structure in the cavity; and wherein magnetically moving the magnetic medium in the cavity removes a support structure from the build piece. The additive manufacturing process results in a build material in the cavity; and wherein magnetically moving the magnetic medium in the cavity removes a build material from the cavity.

In one aspect, an article of manufacture created by a method includes loading at least one magnetic medium into a cavity of a build piece, the build piece created by an additive manufacturing process. The method further includes magnetically moving the magnetic medium in the cavity.

Implementations can include any, all, or none of the following features. The magnetic medium includes a material capable of being attracted by a magnet. The magnetic medium includes iron. The magnetic medium includes a material that has the properties of a magnet. The magnetic medium includes magnetite. The magnetic medium including an abrasive surface. The magnetic medium includes a magnetic core and a non-magnetic envelope. The non-magnetic envelope has an abrasive coating. Magnetically moving the magnetic medium in the cavity includes moving a magnet relative to the build piece. Moving a magnet relative to the build piece includes moving the magnet along a path computed based on a three dimensional definition of a part to be created by the additive manufacturing process. Magnetically moving the magnetic medium in the cavity includes pulsing an electromagnet. The article of manufacture including assigning, responsive to magnetically moving the magnetic medium in the cavity of the build piece, a test result for the build piece based on the movement of the magnetic media. The cavity has a cavity surface; and magnetically moving the magnetic medium in the cavity polishes the cavity surface. The build piece has a support structure in the cavity; and wherein magnetically moving the magnetic medium in the cavity removes a support structure from the build piece. The additive manufacturing process results in a build material in the cavity; and wherein magnetically moving the magnetic medium in the cavity removes a build material from the cavity.

Implementations may include one or more of the following advantages. By magnetically moving a medium inside of additively-manufactured part, support structures (e.g., structures in a cavity that are not readily accessible) can be removed, the inner surfaces (e.g., surfaces of a cavity) of the part can be polished, and/or the part can be tested (e.g., to ensure the cavity of the part is formed correctly) in a single process. The single process may be highly automated, requiring less operator-time than other processes that accomplish the same or similar results. The motion used to process an additively-manufactured part may be derived from the definition of the part needed for the additive manufacturing of the part. The movement of polishing media may be used to polish internal surfaces of a part that cannot be polished by other methods such as extrusion polishing. For example, these processes may polish internal cavities having acute internal angles. By magnetically moving a medium inside of additively-manufactured part, polishing of the build piece is possible without accretion and other undesirable ballistic effects often associated with compressed liquid flow. By magnetically moving a medium inside of additively-manufactured part it is possible to create new structures in the build device, such as depressions and other textures. These new structures may have finer details than is possible with the additive manufacturing process used to create the build piece.

DESCRIPTION OF DRAWINGS

Like reference symbols in the various drawings indicate like elements

DETAILED DESCRIPTION

A build piece can be created from a build plan by an additive manufacturing process (e.g., a direct metal manufacturing process), such as that described herein. The build piece may include one or more internal cavities accessible by ports to the surface of the build piece. Magnetic media can be loaded into the build piece and magnetically moved within the cavity. In some implementations, the build piece may be held stationary and a magnetic controller can be robotically moved relative to the build piece to move the magnetic medium. In some other implementations, a magnetic controller can be held stationary and the build piece may be robotically moved relative to the magnetic controller to move the magnetic medium.

Magnetically moving at least one medium within a build piece can be used to accomplish a number of goals. In some cases, the media can be used to polish one or more surfaces of an internal cavity of the build piece. In some cases, the media can be used to flush out un-solidified build material that has been left in the internal cavity. In some cases, moving the medium allows the build piece to be tested to ensure that an internal cavity is the correct shape and size. Other uses are possible.

Figure 1:
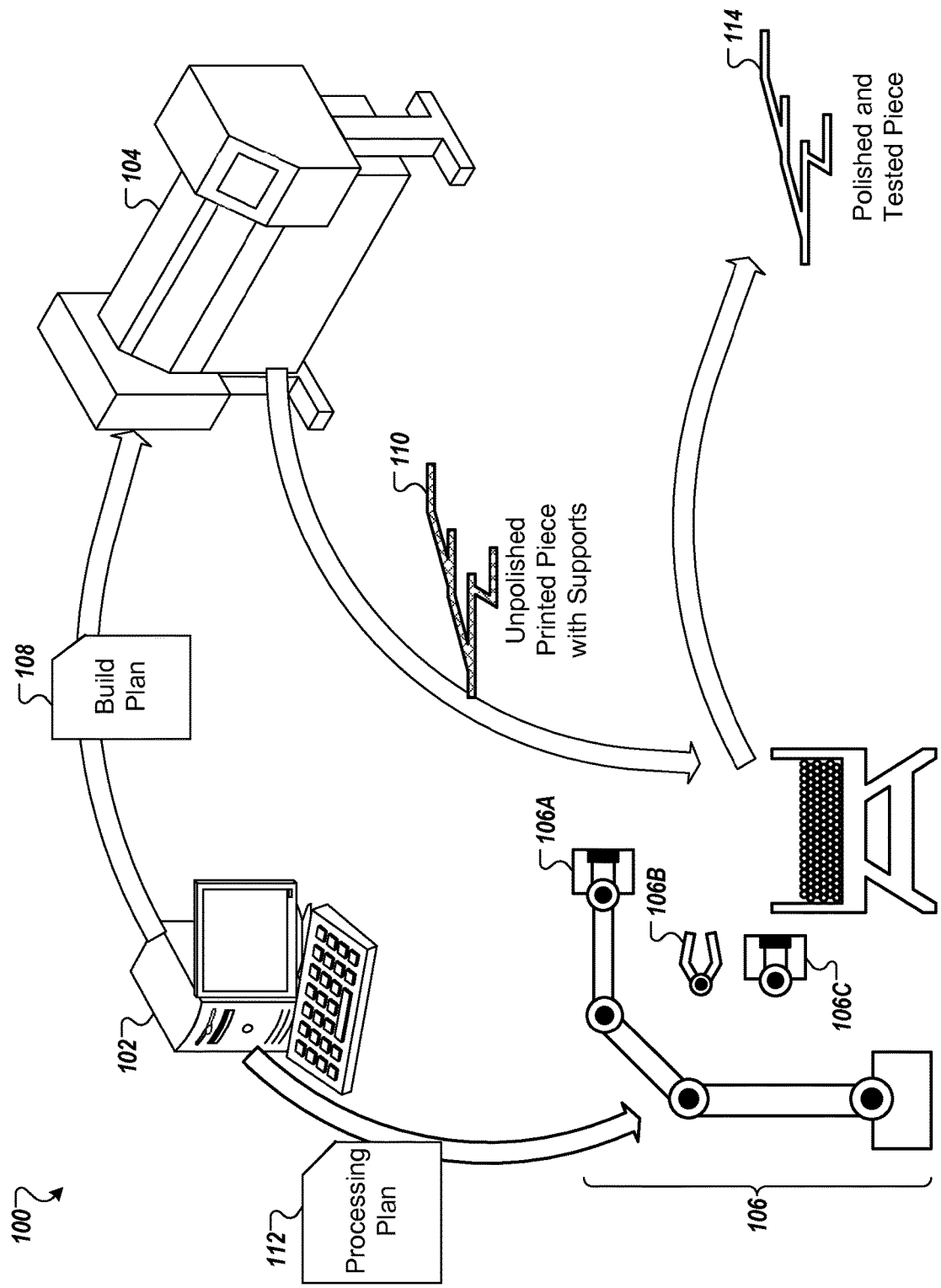
FIG. 1 shows an exemplary system for processing pieces created via an additive manufacturing process.

FIG. 1 shows an exemplary system 100 for processing pieces created via an additive manufacturing process. The system 100 can include, but is not limited to, a computer system 102, an additive-manufacturing printer 104, and a magnetic media station 106. In general, the system 100 may be used to design, print, and process a desired manufactured part.

The computer system 102 can include any type of appropriate computing hardware and software used to design a part to be created by an additive metal deposition process. For example, the computer system 102 may include one or more computers loaded with computer aided drafting (CAD) programs. A user may use these programs to load, create, or modify a three dimensional (3D) definition of a desired part. In some implementations, the computer system 102 can include multiple computers or work stations networked together via a computing network. A desktop computer is shown, but different or additional computer types may be included in the computer system 102. These may include, but are not limited to, laptops, mobile computing devices, network servers, and distributed application servers (sometimes known as cloud service providers).

Using the CAD application or another application, the same user or a different user may create a build plan 108 for the desired part. In some implementations, the build plan 108 can be created by modifying the 3D definition of the desired part. For example, the 3D definition of the desired part can be split into layers according to a format used by the additive-manufacturing printer 104. In some implementations, the build plan can be one or more data files that conform to the Standard Tessellation Language (STL), Additive Manufacturing File Format (AMF), Polygon File Format (PLY), or other well-known or custom formats. The build plan 108 can be loaded into the additive-manufacturing printer 104 by a suitable method. For example, the computer system 102 can communicate the build plan 108 to the additive-manufacturing printer 104 via a computer network or a human user may transport the build plan 108 on a removable computer readable medium such as a compact disk (CD) or removable memory stick.

Once the additive-manufacturing printer 104 has received the build plan 108, the additive-manufacturing printer 104 can create a build piece 110 (e.g., a printed, unpolished piece with supports) from the build plan 108. The additive-manufacturing printer 104 can be configured to manufacture metal pieces from a powdered metal, solid resin pieces from liquid resins, plastic pieces from heated thermoplastics, or other types of pieces from other build materials.

In some cases, the additive-manufacturing printer 104 includes a computer controlled laser that sinters, melts, or solidifies a layer of a build material into a solid piece according to a loaded build plan 108. In some cases, the additive-manufacturing printer 104 includes a computer controlled nozzle that extrudes a liquid build material that solidifies in ambient atmosphere or cures under heat or UV irradiation. This layer-wise process (i.e., an additive manufacturing process) may be repeated until the build piece 110 specified by the build plan 108 is created.

The build piece 110 can be loaded into the magnetic media station 106 for processing. The magnetic media station 106 can include facilities for an operator or unmanned control system to process the build piece 110 with magnetic media. It can include, but is not limited to one or more robotic arms, a hopper of magnetic media, vices, jigs, and conveyers for processing and moving the build piece 110.

The computer system 102 can generate a processing plan 112 that can be loaded into the magnetic media station 106. For example, a user of the computer system 102 can load, create, or modify the processing plan 112 based on the 3D definition of the desired part (e.g., the final product). The processing plan 112 can include, for example, instructions for robotic movement of the build piece 110 or a magnetic controller of the magnetic media station 106. These instructions may be configured, for example, to polish an internal surface of the build piece 110, to clean out residual build materials in the build piece 110, and/or to test the build piece 110 to control its quality. In some cases, the instructions of the processing plan 112 can be in a proprietary or open language used by one or more robotic controllers of the magnetic media station 106. Example of robotic control languages include, but are not limited to VAL, RC+, and ROBOFORTH.

Magnetic media of the magnetic media station 106 can be loaded into the build piece 110 by a suitable method. For example, either a human or automated machine can retrieve a measured or unmeasured volume of magnetic media from a supply of available magnetic media and pour the magnetic media into one or more ports of the build piece 110. After the magnetic media are loaded, a magnetic controller can be moved relative to the build piece 110 such that the magnetic media are moved within the build piece 110. The magnetic controller can include any sort of machine that can control the relative locations of the build piece 110 and a magnetic device that is attractive to the magnetic media. For example, the build piece 110 can be loaded into a vice or jig, and a robotic arm with a magnetic manipulator can be moved along a path near the build piece 110 to move the magnetic medium. The robotic arm may have available different manipulators useful for different techniques to move the magnetic media. For example, the robotic arm is shown with a manipulator 106A that contains a magnet, and with available a grasping manipulator 106B and a manipulator 106C that contains a magnetically-reactive material. The travel path of the robot may be defined, for example, by the processing plan 112.

Once the process plan 112 has been completed, the processed build piece 114 can be removed from the magnetic media station 106 and prepared for further processing, packaging, etc. Depending on the specifications of the process plan 112, the processed build piece 114 may have been polished, cleaned, and/or tested. A piece that has failed a test may be, for example, documented and scrapped. A piece that has passed the test may be utilized in a larger product, put into use, subjected to further testing or polishing, etc.

Figure 2:
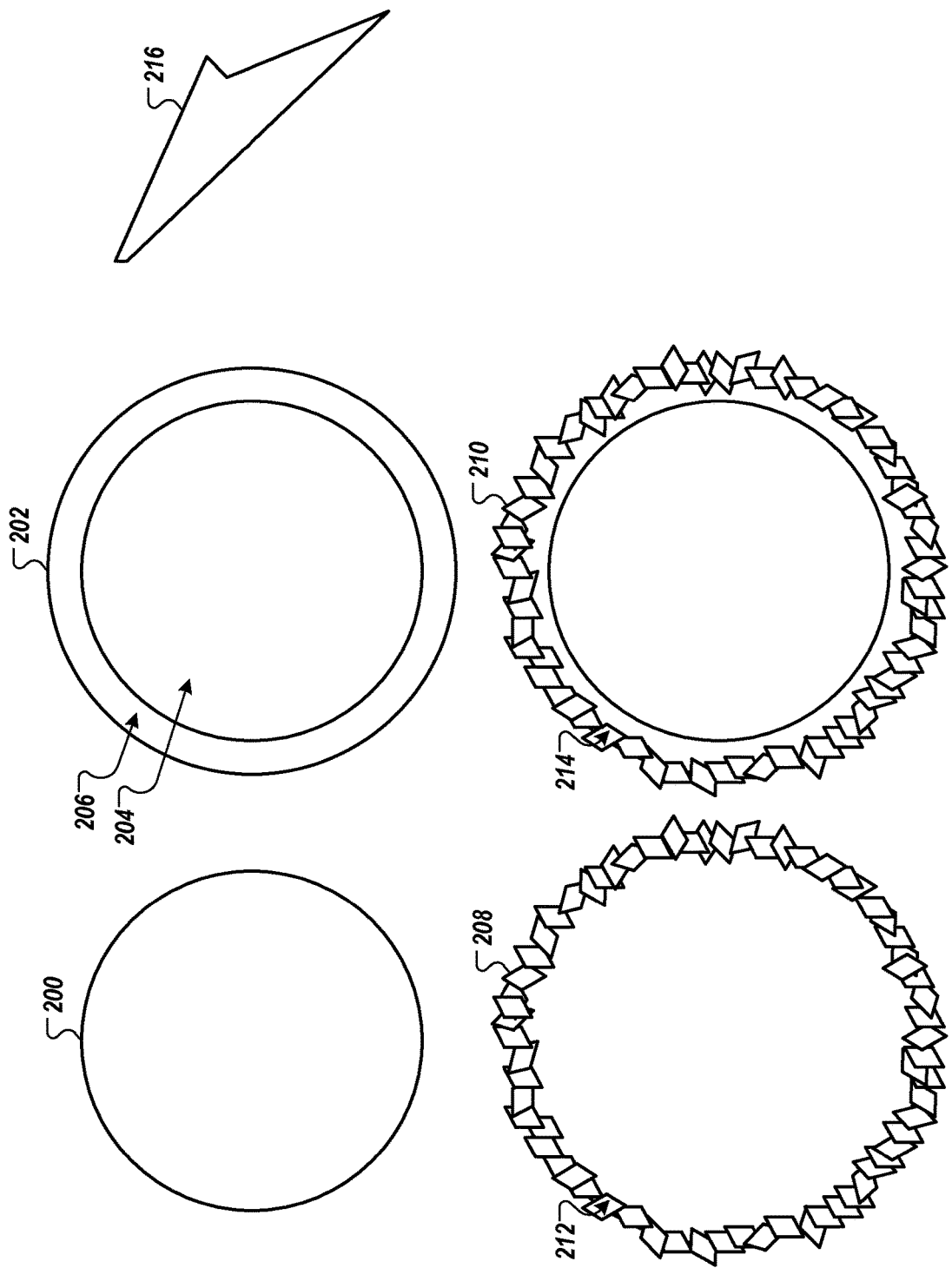
FIG. 2 shows five exemplary magnetic media that can be used in processing additive-manufacturing pieces.

FIG. 2 shows exemplary magnetic media that can be used in processing an additively-manufactured piece (e.g., the build piece 110 described above). Generally, any appropriate object that is magnetic and can be used in processes such as described in this document may be considered magnetic media. Most magnetic media can be identified as being smaller than the port of a build piece and either has the properties of a magnet (e.g., magnetite) or is attracted to a magnet (e.g., iron). Five exemplary classes of media are shown here, but it will be appreciated that a large variety of media may be used to process build pieces, including media types not described here. For example, some of magnetic media shown are spherical, but other shapes may be used, including media of different regular shapes (e.g., cubes, regular prisms, cones) irregular shapes (e.g., irregular powders, filings). If a magnetic medium is used in a polishing process, it may also be referred to as an abrasive or polishing medium. Generally, but not always, an abrasive medium will be harder than the additively-manufactured piece being polished. In some cases, commercially available products such as ball bearings can be used as a magnetic medium. In other cases, custom-ordered or custom-created products can be used as a magnetic medium.

In some applications, a single medium is used for processing a piece. For example, a build piece with internal support structures may be processed by a single, relatively large, medium (e.g., a metal ball) used to knock the support structures off the build piece. In another example, a build piece may be polished with a plurality of relatively small media that each has abrasive surfaces.

Magnetic medium 200 is an example that consists of a single material in a general spherical shape. The single material can be a magnetic material such as iron, nickel, a permanent magnet, or steel. Permanent magnets include, but are not limited to ferrite and rare earth magnets. Magnetic medium 200 can be selected for processing for a number of reasons.

For example, a single magnetic medium 200 can be used to knock support structures out of internal cavities of an additively-manufactured piece. In another example, a plurality of magnetic media 200 can be used to polish the internal surfaces of an additively-manufactured piece.

Magnetic medium 202 is an example that includes a core 204 and an envelope 206. In some implementations, the core 204 is magnetic and the envelope 206 is non-magnetic, or vice-versa. In other implementations, both the core 204 and the envelope 206 are magnetic. Magnetic media 202 can be selected for processing for a number of reasons.

For example, a plurality of magnetic medium 202 with a magnetic core 204 and non-magnetic envelop 206 may be used to process an additively-manufactured piece that is magnetic itself. Depending on the configuration, the non-magnetic envelop 206 can prevent the magnetic cores 204 from touching the magnetic additively-manufactured piece, thus encouraging freer movement of the magnetic media 202 than if a plurality of magnetic media 200 (which does not have a non-magnetic envelop) are used.

In another example, the envelope 206 in the magnetic medium 202 can be made of a soft material. This may be useful, for example, in a process design to clean out residual build materials from the additively-manufactured piece in internal cavities without affecting the finish of the additively-manufactured piece.

Magnetic media 208 and 210 correspond to the magnetic media 200 and 202, respectively, with the addition of abrasive coatings 212 and 214. The abrasive coatings 212 and 214 can be made of any appropriately abrasive materials that may be adhered to the surface of the media. Generally, but not always, the abrasive coatings 212 and 214 can be used when the magnetic media 208 and 210 are used to polish an additively-manufactured piece, and thus may generally be referred to as a polishing medium. Similarly, the magnetic media 200 and 202 may or may not be polishing media, depending on their use.

The abrasive coatings 212 and 214 can be magnetic or non-magnetic. The selection of material for the abrasive coatings 212 and 214 can be based, at least partly, on the type of material to be polished. For example, to polish a metal additively-manufactured part, a harder metal or diamond coating may be used for the abrasive coatings 212 and 214. For a thermoplastic additively-manufactured part, sand or metal powder may be used for the abrasive coatings 212 and 214.

Magnetic medium 216 is an example of an irregular shaped magnetic medium. The magnetic medium 216 may be made from a single material including but not limited to iron, nickel, a permanent magnet, or steel, or from multiple materials bonded together, including non-magnetic materials. Examples of irregular shaped medium includes, but is not limited to, filings, powders, or grains of consistent (e.g., all granule sized) or varying (e.g., a mix of granule to coarse sand) size.

Figure 3:
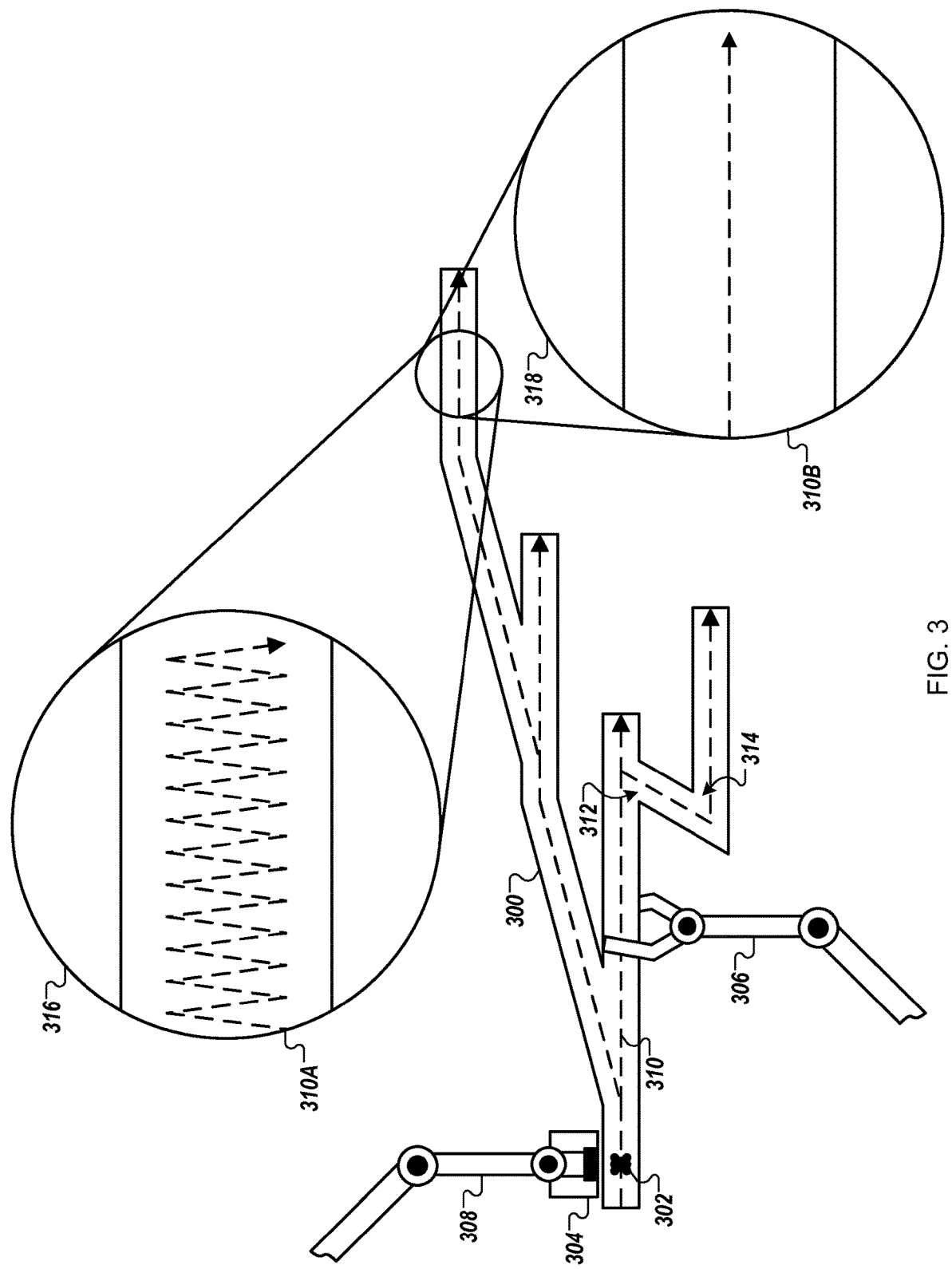
FIG. 3 shows an exemplary build piece being processed.

FIG. 3 shows an exemplary build piece 300 being processed. The build piece 300 can be, for example, an instrument housing created by an additive-manufacturing process, such as a direct metal deposition process in which metal powder is sintered or melted by a laser in a layer-by-layer process to form a solid piece. The instrument housing can include an internal cavity into which sensitive thermocouple sensors can be loaded. However, during manufacture, the cavity has been constructed with internal support structures, and the finish of the surface of the cavity is rough enough to damage the thermocouples (see FIG. 4). In such implementations, the build piece 300 can undergo processing to 1) remove the internal support structures, 2) remove any remaining build material in the internal cavity, and 3) polish the surface of the internal cavity.

As shown in FIG. 3, a plurality of media 302 can be first loaded into the build piece 300. The media 302 is magnetic, thus magnetic media, and used to polish the build piece 300, thus polishing media. Although a variety of media types can be used (see FIG. 2), the media 302 are iron filings.

An electromagnet 304 can be moved relative to the build piece 300 to draw the media 302 through internal cavities in the build piece 300. In some implementations, the electromagnet 304 is held stationary while the build piece 300 is moved relative to the electromagnet 304, for example by a robotic manipulator 306. In some implementations, the build piece 300 is held stationary while the electromagnet 304 is moved relative to the build piece 300, for example by a robotic manipulator 308. In some implementations, both the build piece 300 and the electromagnet 304 are moved relative to each other. While an electromagnet 304 is shown here, any appropriate magnet may be used. For example, a permanent magnet such as a rare earth magnet can be used as an electromagnet 304.

The electromagnet 304 can be moved relative to the build piece 300 along one or more paths 310. These paths 310 can be created based on the build plan 108 according to the shape of the build piece 300. For example, the computer system 102 can generate the paths from the 3D definition of a part and record the paths as robotic motion instructions in the processing plan 112. As shown in FIG. 3, the paths 310 may all originate at one port in the build piece 300 and terminate at different ports in the build piece 300. In such a case, it may be necessary to reload the media 302 after the electromagnet 304 traverses each of the paths 310. In another implementation, the paths 310 can originate at different ports and terminate at different ports in the build piece 300. In another implementation, a single path 310 can traverse the entire cavity of the build piece 300. In such a case, the media 302 may only need to be loaded into the build piece 300 once.

In the example shown, the cavity of the build piece 300 includes two acute angles 312 and 314. Unlike some other forms of processing method (e.g., extrusion polishing), the processing method described herein can process a cavity with acute angles without a degradation in results.

In some implementations, a build piece's cavity can have one or more major axes, and the paths 310 can generally follow the major axes. This is illustrated in example detail window 316A in FIG. 3. In some implementations, when the media 302 is much smaller than the internal cavity of the build piece 300, the path 310 may not follow the major axes of the build piece 300. This is illustrated in the detail window 316 in FIG. 3. Here, the path 310B generally follows the major axes of the build piece 300, but also sweeps back and forth around the major axes. In some implementations, this may be desirable to ensure the media 302 polish the entire surface of the cavity.

Also as shown in the detail window 316, the paths 310 can call for intermittent disengagement by the electromagnet 304. As it is an electromagnet, the electromagnet 304 may be pulsed while moving along the paths 310 to intermittently disengage the media 302. In the case of, for example, a permanent magnet (not shown), the intermittent disengagement can be accomplished by, for example, moving the permanent magnet farther away from the build piece 300 for the portions of the paths 310 that call for disengagement. Intermittent disengagement can be used, for example, to improve polishing results, to prevent the media 302 from clumping, to separate the media 302 from non-magnetic build material, and for other uses.

Different processes may be used to accomplish different results. For example, one process may be used to remove support structures of the build piece 300 and another series of polishing processes may be used to polish the surfaces of the internal cavity of the build piece 300. To remove the support structures, relatively large, smooth surfaced media may be used. Once the support structures are removed, a series of successive polishing processes may be applied to the build piece 300. Each successive polishing process may use relatively smaller media with successively finer abrasive surfaces. This may be desirable, for example, if the build piece 300 is to be used as a pipe or other sort of component in a closed system in which fluid flows. As is known, as the dimensions of a pipe become small relative to forces of the fluid such as surface tension, the finish of the surfaces of the closed system are of greater concern.

In another example, to test that the build part 300 is build according to its build plan, a different process may be used than those used to polish the build part 300. In a testing process, a single medium 302 can be used instead of a group of media 302. If, for example, the build piece is designed to house a thermocouple a sixteenth of an inch in diameter, a single medium 302 can be a ball bearing marginally larger a sixteenth of an inch in diameter and made from a material that is as soft or softer than the thermocouple.

The electromagnet 304 can magnetically move the medium 302 through the internal cavity of the build piece 300 along the paths 310 as part of the testing of the build piece 300. For example, if the medium 302 follows the electromagnet 304 to each of the ports at the end of the paths 310, the build piece 300 may be approved as being built according to its build plan. This may indicate, for example, that there are no obstructions within the internal cavity that would prevent the thermocouple from traveling through the internal cavity. As a part of another test, the medium 302 may be made of, or enveloped in (see medium 202 of FIG. 2) the same material as the thermocouple is made of. In such implementations, if the medium 302 emerges and is without scratches, this may indicate that a thermocouple can pass through the internal cavity without receiving scratches and thus the build piece 300 may be verified as passing the test. If, on the other hand, the medium 302 fails to emerge from a port, or if the medium 302 emerges with scratches, the build piece 300 may be considered as failing the test. In the case of a failed build piece 300, the build piece may be inspected, disposed of, repaired, or have other appropriate action taken.

In some implementations, the observation of the medium 302 during or after a test may be performed by a human operator, an automated sensor, or both.

Figure 4:
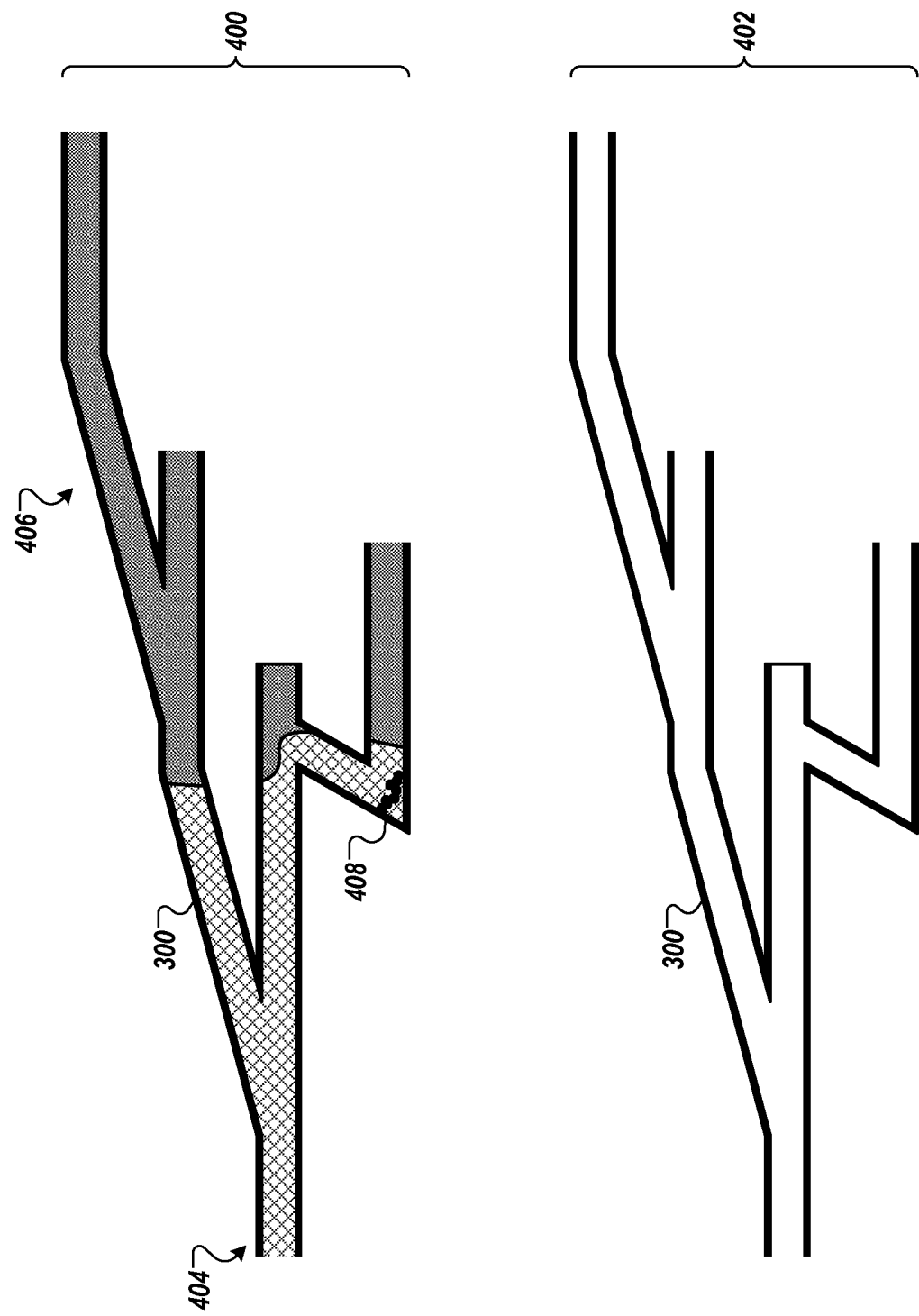
FIG. 4 shows the build piece in FIG. 3 before and after being processed.

FIG. 4 shows the build piece 300 before and after being processed. For illustrative purposes, the build piece 300 is shown in two cross-sectional views 400 and 402.

The view 400 shows a cross-sectional view of the build piece 300 after it has been printed, but before it has been processed by as illustrated in FIG. 3. Section 404 shows that, in the internal cavity of the build piece 400, a support structure is created as part of the additive-manufacturing process that creates the build piece 300. Such a support structure is needed, for example, when some layers in an additive-manufacturing process are not fully supported by previous layers in the process. The support structures can provide the needed support, but often need to be removed after manufacture.

Section 406 of view 400 illustratively removes the support structure shown in section 404. In section 406, the surface of the internal cavity of the build piece 300 is shown. Due to, among other factors, the layer-wise process of additive manufacturing, build pieces can have a constrained range of surface finishes when made. For some uses, this range of surface finishes is unacceptably rough and must be polished if the build piece is to be used for some applications. As shown in FIG. 4, the internal cavity of the build piece 300 must be smoothed, for example, to allow the insertion of a sensitive thermocouple sensor that would be ruined if scratched.

Additionally, additive-manufacturing build processes can leave unsolidified build material 408 in the cavity of the build piece 300. Depending on the configuration of the additive-manufacturing, the excess build material may be a powder (e.g., in direct metal manufacturing), a liquid (e.g., in sterolithography), and/or a solid (e.g., in fused deposition). In some cases, the build material 408 can be removed by, for example, blowing compressed air or another fluid through the internal cavity. However, depending on the configuration, this may fail to remove some or all of the build material 408. For example, if the build material 408 is a liquid that is not water soluble and has strong adhesion to the build material 300, a water flush may fail to remove the build material 408. If the build material 480 is fused to the build piece 300 (e.g., as may be the case in fused deposition) or if the build material 408 is in an acute angle of the internal cavity (e.g., as shown in view 400), a flush may fail to remove some or all of the build material 408.

View 402 shows the build piece 300 after processing. As shown in view 402, the support structure has been removed, the surface of the internal cavity has been smoothed, and the build material 408 has been removed. Additionally, the build piece 300 has been tested and found to conform to the requirements of its build plan.

In some cases, the support removal, polishing, build material removal, and testing can be performed in the course of a single process. That is, the electromagnet 304 can traverse the paths 310 a single time to produce this result. However, multiple processes, identical or different, can be performed to produce this result. For example, a first process can be performed to remove the support structures from the internal cavity. A second process can be performed to remove any residual build material 408. A third process can be performed to polish the internal cavity of the build piece 300. A fourth process can be performed to test whether the build piece 300 is built according to its build plan. Optionally, additional processes can be performed to accomplish other results, or as part of these results. For example, the polishing process can be repeated with successively finer grit polishing media 302. The processes for each result can differ according to their purpose. For example, the testing process may require the electromagnet 304 to move in straight lines parallel to the major axes the internal cavity of the build piece 300, while the polishing processes may require the electromagnet 304 to sweep back and forth across the major axes of the internal cavity.

Figure 5:
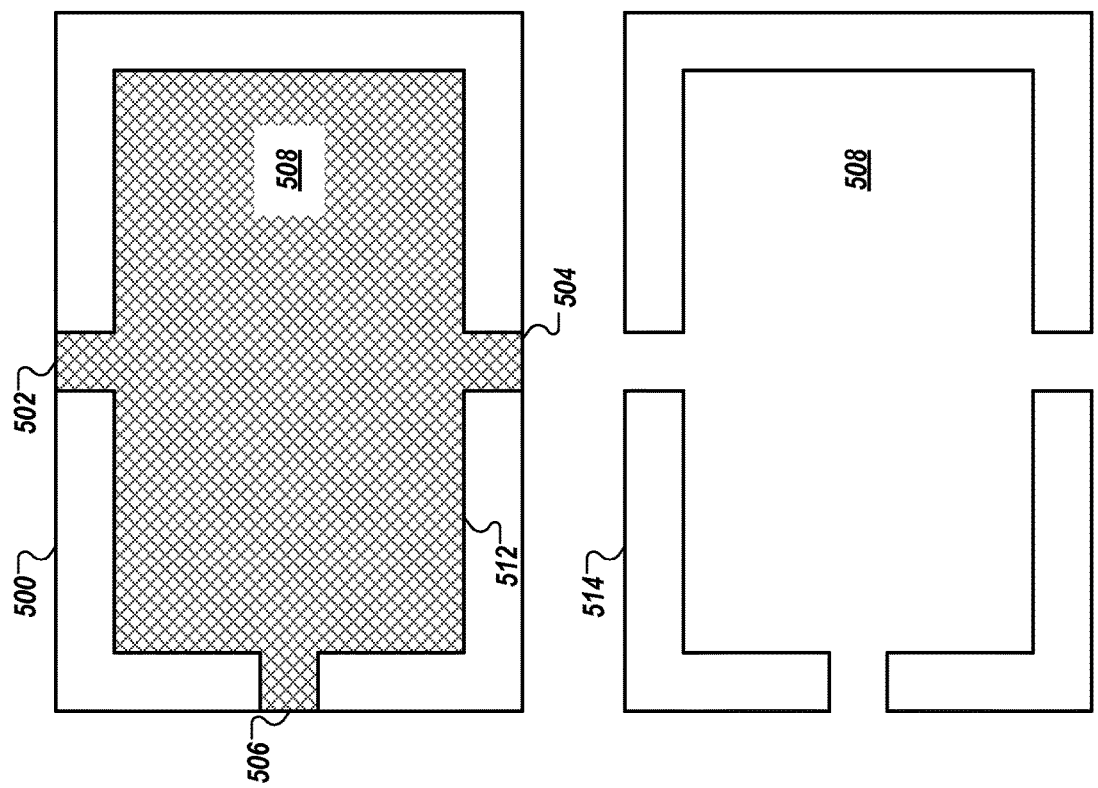
FIG. 5 shows another exemplary build piece before and after being processed.

FIG. 5 shows cross-sectional views of another exemplary build piece before and after being processed. The build piece may be have been created, for example, by the additive-manufacturing printer 104 of the system 100, or any other suitable machine, from a build plan that includes support structures.

As shown in FIG. 5, the build piece 500 may include ports 502, 504, and 506 and an internal cavity 508. The internal cavity 508 is connected to the ports 502, 504,506 such that a magnetic medium can be loaded into the internal cavity 508.

To support the build piece 500 as it is being manufactured, the internal cavity 508 includes a support structure 512. This support structure may be necessary, for example, to support the overhangs created by manufacturing the build piece 500 in an additive manufacturing process (e.g., a layer-wise process). During such a manufacturing process, it is possible that powdered metal or other appropriate build materials may become trapped in the cavity 508, even if that powder is never solidified by the additive-manufacturing printer that manufactures the build piece 500.

Figure 6:
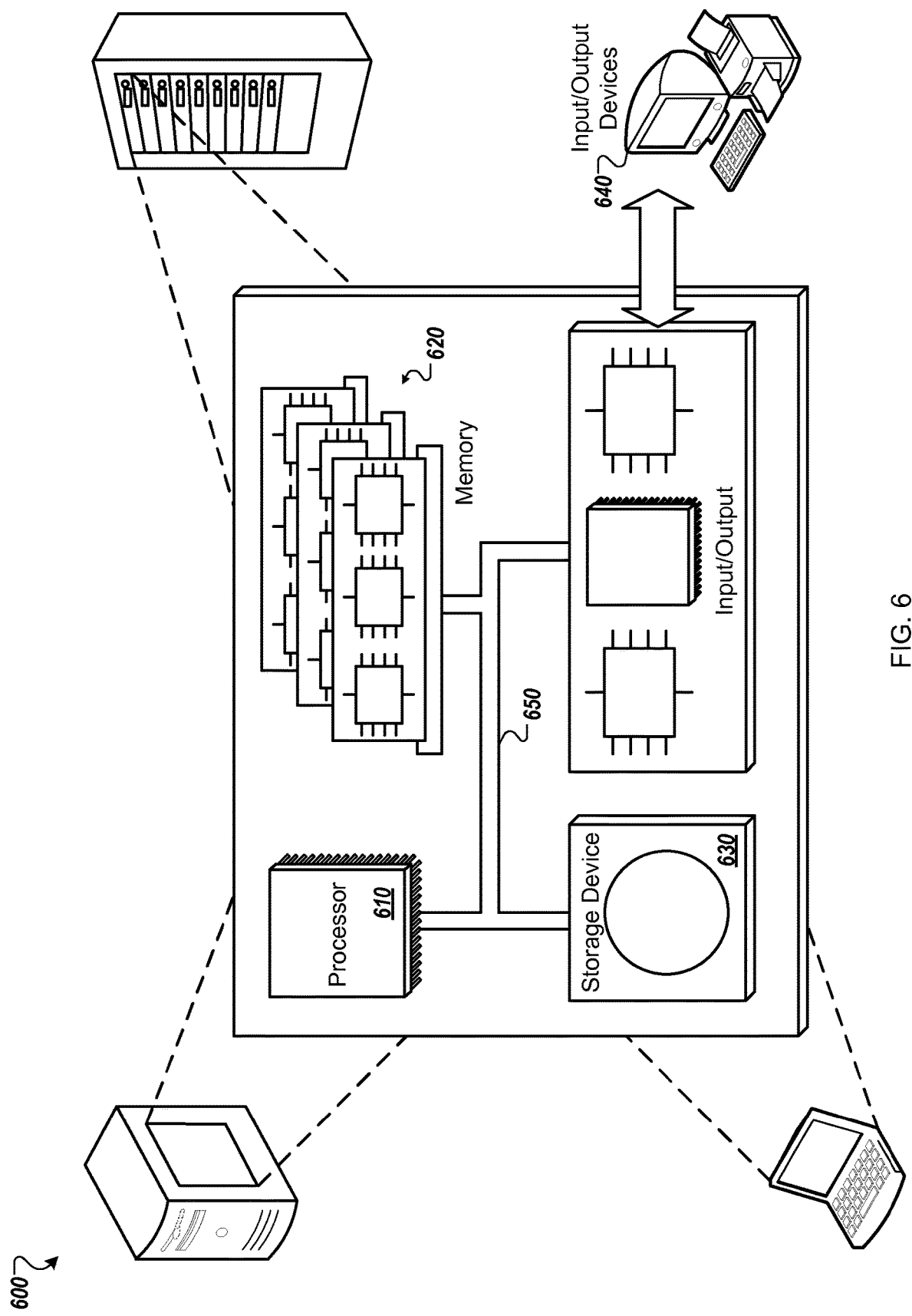
FIG. 6 is a schematic diagram that shows an example of a computing system.

FIG. 6 shows the build piece 514 after the build piece 500 has been processed. In this example, the build piece 500 has only been processed to remove the support structure 512. The internal cavity 508 has not been polished, and residual build material has not been substantially removed, and the build piece 500 has not been tested. In other examples, it is possible that any combination of support structure removal, cleaning, polishing, and testing may be applied to a build piece, as desired. In other examples, the process described herein can include only a single one of support structure removal, cleaning, polishing, and testing, or any combination.

In some implementations, cleaning, polishing, and/or testing may never be applied to the build piece 514. Alternatively, some or all of the cleaning, polishing, and/or testing may be applied using processes other than those described in this document. Additionally, other processes may be applied to the build piece 500 before the processes described in this document, or applied to the build piece 514 after the processes. In one example, the build piece 514 may receive, for example, a chemical etch, painting, or electroplating. In another example, the build piece 500 may receive, before the processes described in this document, other processes such as a chemical etch, painting, or electroplating.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600.

In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method, comprising:
    receiving, by a computer system, a three dimensional (3D) definition of a build piece, the 3D definition defining a plurality of connected internal cavity sections;
    generating, by the computer system, based on the 3D definition, a processing plan that comprises a plurality of instructions by:
        generating at least one path within the connected internal cavity sections as defined by the 3D definition;
        generating the instructions to move a magnet relative to the build piece based on the at least one path;
    loading at least one magnetic medium into a cavity of the build piece, the build piece created by an additive manufacturing process based on the 3D definition;
    moving, by a robot operating according to the instructions in the processing plan, a magnet relative to the build piece to magnetically move the magnetic medium in the cavity; and
    after magnetically moving the magnetic medium in the cavity of the build piece, subjecting the build piece to a quality control test, based on the 3D definition, that uses a different magnetic medium by:
        generating testing-instructions to move the different magnetic medium relative to the build piece based on the at least one path; and
        robotically moving the different magnetic medium relative to the build piece using the testing-instructions.

2. The method of claim 1, wherein the magnetic medium comprises a material capable of being attracted by a magnet.

3. The method of claim 1, wherein the magnetic medium comprises iron.

4. The method of claim 1, wherein the magnetic medium is attracted to a magnet.

5. The method of claim 1, wherein the magnetic medium comprises magnetite.

6. The method of claim 1, wherein the magnetic medium comprising an abrasive surface.

7. The method of claim 1, wherein the magnetic medium comprises a magnetic core and a non-magnetic envelope.

8. The method of claim 7, wherein the non-magnetic envelope has an abrasive coating.

9. The method of claim 1, wherein magnetically moving the magnetic medium in the cavity comprises pulsing an electromagnet.

10. The method of claim 1, wherein the cavity has a cavity surface; and
    magnetically moving the magnetic medium in the cavity polishes the cavity surface.

11. The method of claim 1, wherein the build piece has a support structure in the cavity; and
    wherein magnetically moving the magnetic medium in the cavity removes the support structure from the build piece.

12. The method of claim 1, wherein the additive manufacturing process results in a build material in the cavity; and
    wherein magnetically moving the magnetic medium in the cavity removes the build material from the cavity.

* * * * *